(12) United States Patent
Sellin et al.

(10) Patent No.: US 8,051,466 B2
(45) Date of Patent: Nov. 1, 2011

(54) RFID BASED NETWORK ADMISSION CONTROL

(75) Inventors: John Sellin, Milpitas, CA (US); Alex Bahel, San Jose, CA (US); Tajinder Maan, San Jose, CA (US); Ajay Malik, Santa Clara, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 1068 days.

(21) Appl. No.: 11/864,543

(22) Filed: Sep. 28, 2007

(65) Prior Publication Data

US 2009/0085744 A1   Apr. 2, 2009

(51) Int. Cl.
   *G06F 12/14* (2006.01)
(52) U.S. Cl. .......................... 726/4; 380/270
(58) Field of Classification Search ............... 340/13.26, 340/12.51
   See application file for complete search history.

(56) References Cited

U.S. PATENT DOCUMENTS

| 7,187,287 B2 * | 3/2007 | Ryal | 340/572.1 |
| 7,667,573 B2 * | 2/2010 | Ehrman et al. | 340/10.1 |
| 2006/0107307 A1 * | 5/2006 | Knox et al. | 726/2 |
| 2007/0129083 A1 * | 6/2007 | Creamer et al. | 455/456.1 |

FOREIGN PATENT DOCUMENTS

WO   2006039119 A1   4/2006

OTHER PUBLICATIONS

Goker et al., "An Ambient, Personalised, and Context-Sensitive Information System for Mobile Users", Nov. 8-10, 2004, EUSAI, pp. 19-23.*
Molnar et al., "Privacy for RFID Through Trusted Computing", Nov. 7, 2005, WPES, pp. 31-34.*
EPO Search Report to corresponding Application No. 08835475.8 dated Nov. 3, 2010—6 pages.

* cited by examiner

*Primary Examiner* — Matthew Smithers

(57) ABSTRACT

A system for controlling access to a network includes a wireless switch configured for radio frequency communication with a mobile unit associated with a radio frequency identification tag. The wireless switch is adapted for determining if a radio frequency identification tag is located within a first area, and enabling the mobile unit to access the network according to a first scheme if the mobile unit is located within the first area.

16 Claims, 3 Drawing Sheets

RFID BASED NETWORK ADMISSION CONTROL

FIELD OF THE INVENTION

The present invention relates generally to radio frequency identification (RFID) systems, wireless local area networks (WLANs), and other such networks incorporating RF tags, and, more particularly, to RFID based network admission control.

BACKGROUND OF THE INVENTION

In recent years, radio frequency identification (RFID) systems have achieved wide popularity in a number of applications, as they provide a cost-effective way to track the location of a large number of assets in real time. In large-scale applications (e.g., warehouses, retail spaces, and the like), many types of tags may exist in the environment (or "site"). Likewise, multiple types of readers, such as RFID readers, active tag readers, 802.11 tag readers, Zigbee tag readers, and the like are typically distributed throughout the space in the form of entryway readers, conveyer-belt readers, mobile readers, etc., and may be linked by network controller switches and the like.

In many instances it is desirable to know the location of a tag within a building or other such site. Furthermore, it is desirable to control access to one or more networks associated with the tags, particularly when the information accessed through the network is of a sensitive or proprietary nature.

Accordingly, it is desirable to provide systems and methods for controlling access to a network based on one or more RFID technologies. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

In one embodiment, by ay of example only, a system for controlling access to a network is disclosed. The system includes a wireless switch configured for radio frequency communication with a mobile unit associated with a radio frequency identification tag. The wireless switch is adapted for determining if a radio frequency identification tag is located within a first area, and enabling the mobile unit to access the network according to a first scheme if the mobile unit is located within the first area.

In another embodiment, again by way of example only, a method for controlling access to network services includes determining if a radio frequency identification tag is located within a first area, and enabling a mobile unit affiliated with the tag to access the network services according to a first scheme if the mobile unit is located within the first area.

In still another embodiment, again by way of example only, a system for controlling access to a network includes means for associating a radio frequency identification tag with a mobile unit, means for determining if the radio frequency identification tag is located within a first area, and means for enabling access to the network according to a first scheme if the radio frequency identification tag is within the first area.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
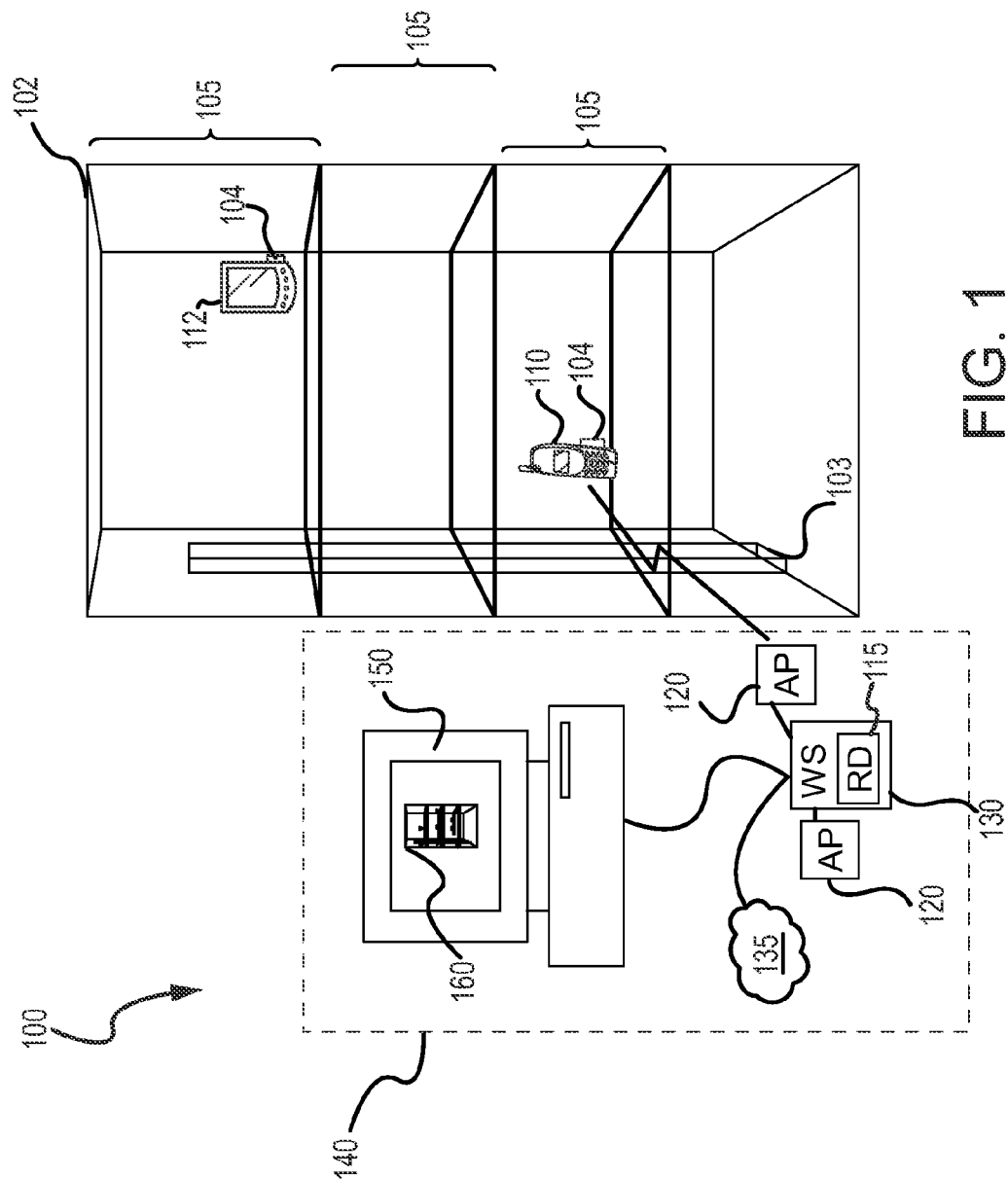
FIG. 1 illustrates an exemplary system for controlling access to a network.

The following detailed description of the invention is merely exemplary in nature and is not intended to limit the invention or the application and uses of the invention. Furthermore, there is no intention to be bound by any theory presented in the preceding background of the invention or the following detailed description of the invention.

For simplicity and clarity of illustration, the drawing figures depict the general structure and/or manner of construction of the various embodiments. Descriptions and details of well-known features and techniques may be omitted to avoid unnecessarily obscuring other features. Elements in the drawings figures are not necessarily drawn to scale: the dimensions of some features may be exaggerated relative to other elements to assist improve understanding of the example embodiments.

Terms of enumeration such as "first," "second," "third," and the like may be used for distinguishing between similar elements and not necessarily for describing a particular spatial or chronological order. These terms, so used, are interchangeable under appropriate circumstances. The embodiments of the invention described herein are, for example, capable of use in sequences other than those illustrated or otherwise described herein. Unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

The terms "comprise," "include," "have" and any variations thereof are used synonymously to denote non-exclusive inclusion. The terms "left," "right," "in," "out," "front," "back," "up," "down," and other such directional terms are used to describe relative positions, not necessarily absolute positions in space. The term "exemplary" is used in the sense of "example," rather than "ideal."

For the sake of brevity, conventional techniques related to signal processing, data transmission, signaling, network control, the 802.11 family of specifications, wireless networks, RFID systems and specifications, and other functional aspects of the system (and the individual operating components of the system) may not be described in detail herein. Furthermore, the connecting lines shown in the various figures contained herein are intended to represent example functional relationships and/or physical couplings between the various elements. Many alternative or additional functional relationships or physical connections may be present in a practical embodiment.

The following description and claimed subject matter generally relate to systems and methods for RFID based network admission control. Specifically, the systems and methods determine if an RFID tag, associated with a mobile unit, is located within an area. In one embodiment, a wireless switch is configured to determine if the RFID tag is located within a specific area. If the RFID tag is determined by the RFID switch to be within the area, the switch may apply a script setting to enable a network admission scheme dedicated to the area for the mobile unit.

If the mobile unit (and thereby, the RFID tag associated with the mobile unit) is determined to have left the area, the switch may terminate the network admission scheme. Accordingly, the mobile unit then is denied access to the network. Alternatively, if the mobile unit is determined to have moved to second area having a second dedicated network access scheme, the wireless switch may then enable the second scheme for the mobile unit.

Referring now to FIG. 1, an example environment 102 useful in describing the present invention generally includes a building or other site (alternatively referred to as an "environment"). Note that while a three-dimensional, multi-floored building is illustrated in FIG. 1, the invention is not so limited. That is, environment 102 may be any two-dimensional or three-dimensional space within or without a building and other structure. Example environments include, for example, single-story buildings, multi-story buildings, school campuses, commercial buildings, warehouses, and like structures.

A number of RF tags ("RFID tags," or simply "tags") 104 are associated with mobile units which are distributed throughout environment 102. In general, these tags 104 may be associated with a variety of mobile units (MUs), such as cellular phones 110, or personal desktop assistants (PDAs) 112 as shown. As one skilled in the art will appreciate, the tags 104 may be associated with the mobile units in a variety of ways. For example, the tags 104 may be physically attached to, or integrated within the mobile units 110 and 112. Tags 104 may be provided within mobile units 110 and 112 at the time of their manufacture.

In the depicted embodiment, and as described in further detail below, a system 100 includes a wireless switch 130 incorporating or otherwise associated with such devices as a RFID reader 115 (RD) that suitably activates any nearby tags 104 and receives the relevant tag data. The system 100 has access to network services 135, such as the internet, voice over internet protocol (VOIP) services to make phone calls, email, instant messaging, and like services. Additionally, the configuration of system 100 with wireless access points 120 (which may be integrated within or otherwise associated with the wireless switch 130) may establish a wireless local area network (WLAN). The mobile units 110 and 112 may access the WLAN to access the network 135 and thereby, access network 135 services. Various software and hardware (e.g., computer 150, etc.) may also produce a display 160 indicative of the position of a mobile unit 110 or 112 within environment 102 or elsewhere.

Wireless switch(es) 130 and access point(s) 120 may be positioned throughout environment 102 with a density and number that is appropriate given the power of the WLAN as well as structural details (e.g., internal architecture) of environment 102. That is, WS(s) 130 and/or AP(s) 120 may be distributed evenly throughout the site, or may be associated with predefined "zones." In the illustrated embodiment, for example, zones 105 are defined for each floor 105, as well as for an elevator bank 103. The mobile units 110 and 112 (and thereby, tags 104) may be located on a particular zone 105. As a user of the mobile units 110 and 112 moves from one zone to another zone, WS 130 and/or RD 115 may monitor the location of an associated tag 104 and apply various script settings to enable a particular network access scheme dedicated to a particular zone 105. If a user leaves a zone 105, the WS 130 and/or RD 115 may determine that the associated tag 104 is not within a particular zone allowing network access, and discontinue access of the associated mobile unit to the network 135 services.

Tags 104 may be one or more of various types of tags. Examples of tags 104 include, but are not limited to, active tags, passive tags, semi-active tags, WiFi tags, 801.11 tags, and the like RFID tags. Note that the term "RFID" is not meant to limit the invention to any particular type of tag. That is, the term "tag" refers, in general, to any RF element that can be communicated with and has an ID (or "ID signal") that can be read by another component. In general, RFID tags (sometimes referred to as "transponders") may be classified as either an active tag, a passive tag, or a semi-active tag. Active tags are devices that incorporate some form of power source (e.g., batteries, capacitors, or the like) and are typically always "on," while passive tags are tags that are exclusively energized via an RF energy source received from a nearby antenna. Semi-active tags are tags with their own power source, but which are in a standby or inactive mode until they receive a signal from an external RFID reader, whereupon they "wake up" and operate for a time just as though they were active tags. While active tags are more powerful, and exhibit a greater range than passive tags, they also have a shorter lifetime and are significantly more expensive. Such tags are well known in the art, and need not be described in detail herein.

During operation, each tag 104 may be read by RD 115 when the RD 115 is within a range of the particular tag, as is known in the art. In one embodiment, the data transmitted from each tag 104 is read by RD 115 and provided to WS 130. The data transmitted from tag 104, via RD 115, can then be used to determine the approximate location of the tag 104 and thereby, an associated mobile device 110 or 112.

RD 115 and/or WS 130 may have multiple associated antennas (not shown), and may incorporate additional functionality, such as filtering, cyclic-redundancy checks (CRC), and tag writing, as is known in the art. Each antenna within RD 115 or WS 130 has an associated RF range (or "read point"), which depends upon, among other things, the strength of the respective antenna. The read point corresponds to the area around the antenna in which a tag 104 may be read by that antenna, and may be defined by a variety of shapes, depending upon the nature of the antenna. It is not uncommon for RF ranges or read points to overlap in real-world applications (e.g., doorways, small rooms, etc.).

Switching device 130 (alternatively referred to as an "RF switch," "WS," or simply "switch") may be coupled to a network 135 (e.g., a WiFi network coupled to one or more other networks or devices) and communicate with one or more software applications (not shown). Wireless access ports 120 (alternatively referred to as "access ports" or "A") may be configured to wirelessly communicate with RD 115. Access ports 120 suitably communicate with WS 130 via appropriate communication lines (e.g., conventional Ethernet lines, or the like). Any number of additional and/or intervening switches, routers, servers and other network components may also be present in system 100. Additionally, as previously described, an AP 120 may be integrated into WS 130.

In general, WS 130 determines the destination of the packets it receives and routes those packets to the appropriate AP 120. Thus, each AP 120 acts primarily as a conduit, sending/receiving RF transmissions via RF switches 130, and sending/receiving packets via a network protocol with WS 130.

WS 130 may support any number of tags that use wireless data communication protocols, techniques, or methodologies, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; cellular/wireless/cordless telecommunication protocols; wireless home network communication protocols; paging network protocols; magnetic induction; satellite data communication protocols; wireless hospital or health care facility network protocols such as those operating in the WMTS bands; GPRS; and proprietary wireless data communication protocols such as variants of Wireless USB. As described in further detail below, WS 130 includes hardware, software, and/or firmware capable of carrying out the functions described herein. Thus, WS 130 may comprise one or more processors accompanied by storage units, displays, input/output devices, an operating system, database management software, networking software, and the like. Such systems are well known in the art, and need not be described in detail. WS 130 may be configured as a general purpose computer, a network switch, or any other such network host. In a preferred embodiment, WS 130 is modeled on a network switch architecture but includes RF network controller software (or "module") whose capabilities include, among other things, the ability to allow it to configure and monitor RD 115 and its antenna(s).

Locationing of a tag 104 (and thereby, a mobile device 110 and 112) generally involves examining all of the data from one or more RFID tags 104 at a particular time, and then using rules and a locationing algorithm to determine the most likely location of the RFID tag(s) 104 associated with the tag data. In accordance with one embodiment, system 100 is configured to reconcile the location an associated mobile device 110 or 112 based on a pre-defined floor map (i.e., a map of the location of RFID tags 104) and/or a zone map, and produce a graphical representation indicating the position of the mobile devices 110 and 112 within environment 102. This information may be transmitted to a base station 140 (e.g., control center, etc.) through network 135. Any such map and zone information may be preloaded, downloaded over network 135, or received from environment 102. Stated another way, the IDs for each tag 104, and their respective locations, are preferably known prior to beginning the locationing process; however, this knowledge may be distributed over a number of systems and networks. In a particular embodiment, the placement of each RFID tag 104 is predefined, and nomenclature related to that placement is embedded within each RFID tag 104 so that a quick understanding of the floor and/or zone can be determined without the use of drawings.

The following example may be useful in understanding the operation of system 100, wherein a mobile device 110 or 112 is a WiFi-enabled laptop computer, a cellular telephone, a PDA, a Palm Handheld, or other similar device. Here, as mobile device 110 is transported (e.g., by a conveyor belt, a person, a motor vehicle, etc.) through environment 102, RD 115 reads data from each RFID tag 104 that RD 115 comes within range of. RD 115 then transmits the tag data (via WS 130) to computer 150 and is represented on display 160. That is, the location a mobile device 110 may be known in real-time as RFID reader 110 is transported through environment 102.

In one embodiment, a media access control (MAC) address of the mobile unit 110 or 112 may be associated with a particular tag 104. If the RD 115 and WS 130 determine that the particular tag 104 is located within a predefined zone, then the WS 130 may apply a settings script to implement a particular network access scheme dedicated to the particular zone.

Figure 2:
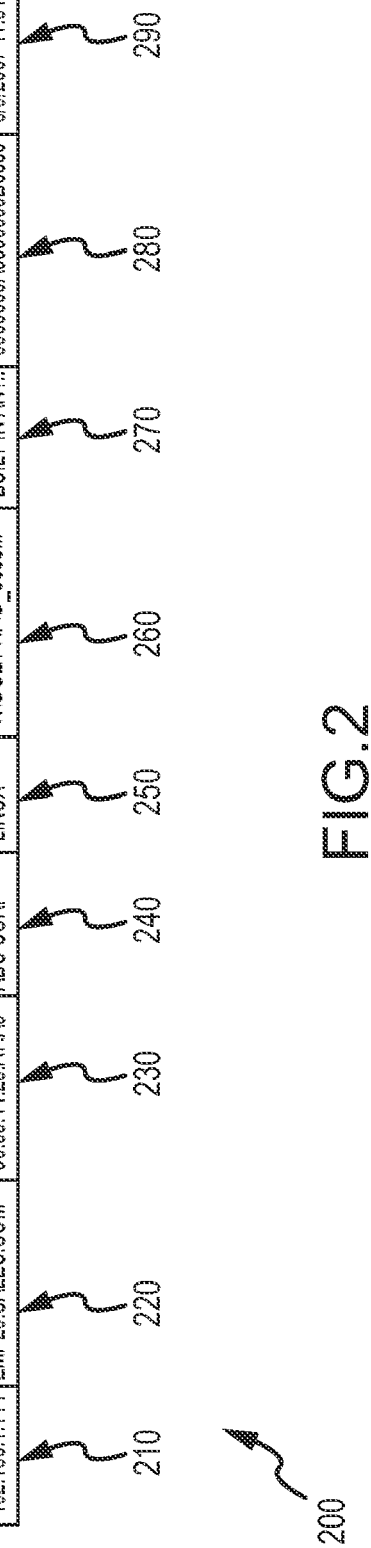
FIG. 2 is an exemplary table of RFID and network related information that may be maintained by a wireless switch.

Turning to FIG. 2, an exemplary table 200 of RFID and network related information is depicted. This information may be maintained and stored by WS 130 on system 100 or elsewhere. Table 200 affiliates such information as a MAC address of a particular mobile unit with a particular tag associated with the mobile unit. As one skilled in the art will appreciate, each mobile unit with the capability to access a WLAN or other network resources has certain characteristics associated with it that may be stored and maintained. These characteristics may then be then associated with a particular tag which is integrated into or otherwise associated with the mobile device. Table 200 includes an internet protocol address (IP) 210 of a particular mobile unit, a domain name server (DNS) address 220 of the mobile unit, a MAC address 230 of the mobile unit, a network interface card (NIC) type 240 affiliated with the mobile unit, and the respective operating system 250 of the mobile unit.

Table 200 then shows the respective RFID tag 260 associated with the mobile unit, the source 270 of the tag information, a unique tag identification number (TIN) 280, and the tag time and date 290. Each of these characteristics may be monitored, stored and updated by such devices as a WS. By linking a characteristic of a mobile unit such as a MAC address with a tag associated with the mobile unit, a degree of security may be maintained such that access to network resources (by the mobile unit accessing resources over the WLAN, for example) is limited by virtue of where the mobile unit is in an environment. For example, an employee may be allowed access to the network to access email messages or make international phone calls over the company's voice over internet protocol (VOIP) system as long as the employee (the mobile device) is located within the building. The employee may be granted additional access to network resources if the employee is located in the building's data center and the employee (mobile unit) has further authenticated itself to the network.

Figure 3:
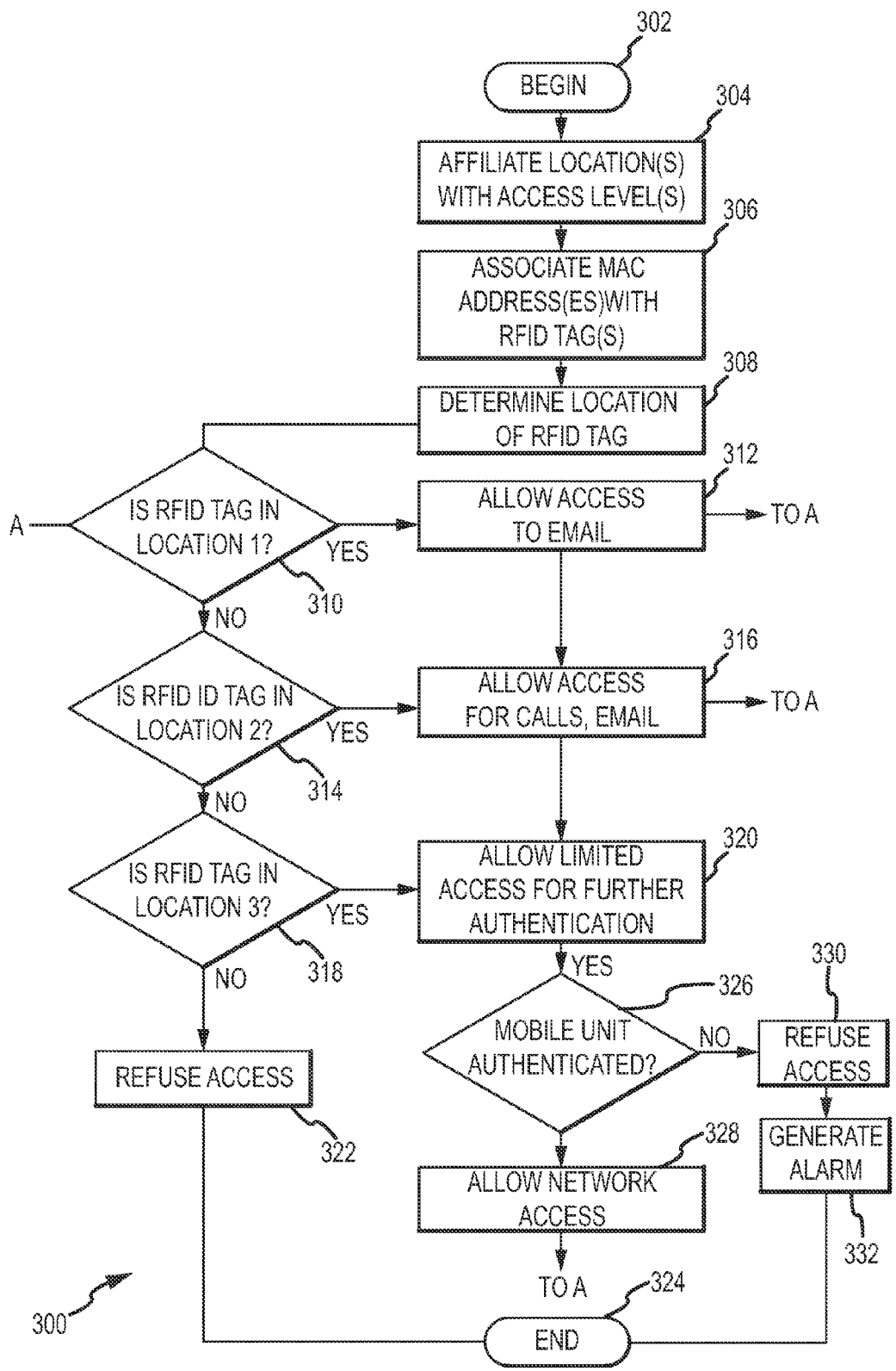
FIG. 3 is a flow chart diagram of an exemplary method for RFID based network admission control.

FIG. 3 illustrates a flow chart of an exemplary method 300 of RFID based network admission control. The method 300 begins (step 302) with the affiliation of various locations (or zones, areas, etc.) with a predetermined level of access. This predetermined level of access may be referred to as a "scheme." A particular scheme may allow certain kinds of access to network resources. For example, a first scheme may grant access to the network for email applications and international phone calls as previously described. Another scheme may grant access to a database located on a datacenter mainframe. Each of these schemes may be dedicated to a certain location, zone or area within the environment.

A MAC address of a mobile unit is then associated with a particular tag (step 306). The association of MAC address with mobile unit may be stored and/or maintained in the WS or elsewhere. The WS may later refer to the table of associated MAC addresses with tags to identify which mobile unit to provide a particular scheme.

Once the MAC address is associated, the mobile unit monitored throughout the environment. Using the methods described previously, the location of a tag (and thereby, a mobile unit) is determined (step 308). Again the location may be determined by use of a RD associated with a WS. If it is determined that the tag is in a first location (step 310) such as a cubicle in the office environment, the WS may then allow access to email pursuant to a first scheme (step 312). If the tag is determined to be in a second location, such as a particular floor within the environment, the WS then allows access to the network resources for international calls and email pursuant to a second scheme (sep 316). If either the result of queries 310 or 314 are affirmative, once the scheme is implemented, the method returns to the query 310 as the mobile device is continuously monitored in the environment.

If the tag is determined to not be in a first or second location, but in a third location, such as in the company's datacenter room (step 318), then the method may allow a limited amount of access to the network for a user on the mobile unit to authenticate the device further to the WS or other network resource (step 320). The limited amount of access may be pursuant to a graduated, third scheme. The user may use a biometric authentication, such as a fingerprint scan on the mobile device, which is sent over the WLAN to the WS (or other component in the system) and analyzed for authenticity. In another embodiment, the authentication may be a password.

If the mobile unit successfully authenticates (step 328), then the WS allows the mobile unit access to a greater degree of network services, such as access to the database previously described. Again, once the larger degree of access is authorized, the method returns to step 310 to continue to monitor the location of the mobile unit. If the mobile unit is unable to authenticate itself (step 330), then the WS refuses or terminates access to the network services (step 330) and generates a notification to an administrator, such as an alarm (step 332). The system may prevent the boot of the mobile device, or the boot of a related device in the third location, for example. The system may disable the mobile device so that the mobile device is no longer operational. In one embodiment, while method 300 is operational, a display of the location of the mobile unit may be rendered on a remote computer (e.g., display 160, FIG. 2) so as to continually monitor the location of approved mobile units within the environment. The method 300 then ends (step 324).

The systems and methods described provide an efficient and effective way to leverage RFID technology to regulate network access. While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

We claim:

1. A system for controlling access to a network, comprising:
a wireless switch configured for radio frequency communication with a mobile unit associated with a radio frequency identification tag, the wireless switch adapted for:
determining if a radio frequency identification tag is located within a first area,
enabling the mobile unit to access the network according to a first scheme if the mobile unit is located within the first area, wherein the first scheme is a graduated access scheme that provides limited access of the network to the mobile unit in order for the mobile unit to perform authentication, wherein
if the mobile unit satisfactorily performs the authentication, enabling access to the network according to a second scheme allowing an access level to the network greater than the limited access, and
if the mobile unit does not satisfactorily perform the authentication, terminating access to the network and enabling an alarm.

2. The system of claim 1, wherein the wireless switch is further adapted for monitoring the radio frequency identification tag to determine if the mobile unit remains located within the first area, and continuing to enable the mobile unit to access the network according to the first scheme while the mobile unit is located within the first area.

3. The system of claim 2, wherein the wireless switch is further adapted for terminating access to the network if the mobile unit is not located within the first area.

4. The system of claim 2, wherein the wireless switch is further adapted for determining if the radio frequency identification tag is located within a second area, and enabling the mobile unit to access the network according to a second scheme if the mobile unit is located within the second area.

5. The system of claim 4, wherein the wireless switch applies a settings script to change the first scheme to the second scheme as the radio frequency identification tag moves from the first area to the second area.

6. The system of claim 1, wherein the wireless switch associates a media access control address of the mobile unit with the radio frequency identification tag.

7. The system of claim 1, wherein the wireless switch is compliant with an 802.11 or WiMAX wide local area network specification.

8. A method for controlling access to network services, the method comprising the steps of:
determining if a radio frequency identification tag is located within a first area;
enabling a mobile unit affiliated with the tag to access the network services according to a first scheme if the mobile unit is located within the area, wherein the first scheme is a graduated access scheme that provides limited access of the network to the mobile unit in order for the mobile unit to perform an authentication step,
performing an authentication of the mobile unit, wherein
if the mobile unit satisfactorily performs the authentication step, enabling access to the network according to a second scheme allowing an access level to the network greater than the limited access, and
if the mobile unit does not satisfactorily perform the authentication step, terminating access to the network and enabling an alarm.

9. The method of claim 8, further comprising the step of monitoring the radio frequency identification tag to determine if the mobile unit remains located within the area, and continuing to enable the mobile unit to access the network services according to the first scheme while the mobile unit is located within the area.

10. The method of claim 8, wherein authentication step is validated by the network services.

11. A system for controlling access to a network, comprising:
means for associating a radio frequency identification tag with a mobile unit;
means for determining if the radio frequency identification tag is located within a first area;
means for enabling access to the network according to a first scheme if the radio frequency identification tag is within the first area, wherein the first scheme is a graduated access scheme that provides limited access of the network to the mobile unit in order for the mobile unit to perform an authentication step, wherein
if the mobile unit satisfactorily performs the authentication step, means enabling access to the network according to a second scheme allowing an access level to the network greater than the limited access, and if the mobile unit does not satisfactorily perform the authentication step, means for terminating access to the network and enabling an alarm.

12. The system of claim 11, further including means for monitoring a location of the mobile unit based on a location of the radio frequency identification tag.

13. The system of claim 12, further including means for continuing to enable access to the network according to the first scheme so long as the location of the mobile unit remains within the first area.

14. The system of claim 11, wherein the means for associating a radio frequency identification tag with a mobile unit is performed using a wireless switch operational on the network.

15. The system of claim 11, wherein the means for associating the radio frequency identification tag with the mobile unit further includes means for associating a media access control address of the mobile unit with the radio frequency identification tag.

16. The system of claim 11, wherein the first scheme further includes means for enabling access to the internet, email, instant messaging, or a wireless local area network.

* * * * *

UNITED STATES PATENT AND TRADEMARK OFFICE
CERTIFICATE OF CORRECTION

PATENT NO. : 8,051,466 B2  
APPLICATION NO. : 11/864543  
DATED : November 1, 2011  
INVENTOR(S) : Sellin et al.

Page 1 of 1

It is certified that error appears in the above-identified patent and that said Letters Patent is hereby corrected as shown below:

In Column 1, Line 40, delete "ay" and insert -- way --, therefor.

In Column 4, Line 51, delete ""A")" and insert -- "APs") --, therefor.

Signed and Sealed this
Eighteenth Day of December, 2012

David J. Kappos
*Director of the United States Patent and Trademark Office*